US008818701B2

(12) United States Patent
Baryshnikov

(10) Patent No.: US 8,818,701 B2
(45) Date of Patent: Aug. 26, 2014

(54) LOCATING SENSOR NODES THROUGH CORRELATIONS

(75) Inventor: Yuliy Baryshnikov, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 381 days.

(21) Appl. No.: 13/369,994

(22) Filed: Feb. 9, 2012

(65) Prior Publication Data

US 2012/0143562 A1 Jun. 7, 2012

Related U.S. Application Data

(62) Division of application No. 11/285,873, filed on Nov. 23, 2005, now Pat. No. 8,140,261.

(51) Int. Cl.
*G06F 19/00* (2011.01)
*G06F 15/00* (2006.01)

(52) U.S. Cl.
USPC ............ 701/300; 702/5; 455/456.1; 707/725; 707/746

(58) Field of Classification Search
USPC ............ 701/300; 702/5; 455/456.1; 707/725, 707/746
See application file for complete search history.

(56) References Cited

U.S. PATENT DOCUMENTS

| | | | |
|---|---|---|---|
| 5,724,487 A | 3/1998 | Streit | |
| 5,870,729 A | 2/1999 | Yoda | |
| 6,072,433 A * | 6/2000 | Young et al. | 342/386 |
| 6,442,394 B1 | 8/2002 | Valentine et al. | |
| 6,654,730 B1 | 11/2003 | Kato et al. | |
| 7,013,308 B1 * | 3/2006 | Tunstall-Pedoe | 707/709 |
| 7,359,712 B2 * | 4/2008 | Gutowski et al. | 455/456.1 |
| 7,526,461 B2 * | 4/2009 | Srinivasa et al. | 706/20 |
| 8,489,115 B2 * | 7/2013 | Rodriguez et al. | 455/456.1 |
| 8,538,669 B2 * | 9/2013 | Agarwal et al. | 701/120 |
| 8,611,871 B2 * | 12/2013 | Terrell, II | 455/414.2 |
| 2002/0083027 A1 | 6/2002 | Biggers et al. | |
| 2002/0089722 A1 | 7/2002 | Perkins et al. | |
| 2002/0122003 A1 | 9/2002 | Patwari et al. | |
| 2002/0168943 A1 | 11/2002 | Callaway, Jr. et al. | |
| 2002/0176494 A1 | 11/2002 | Zhao et al. | |
| 2003/0128355 A1 | 7/2003 | Perkins et al. | |
| 2003/0130793 A1 | 7/2003 | Patwari et al. | |

(Continued)

FOREIGN PATENT DOCUMENTS

| | | |
|---|---|---|
| EP | 1460801 A1 | 9/2004 |
| WO | 02003146 A2 | 10/2002 |
| WO | 2004002074 A2 | 12/2003 |

OTHER PUBLICATIONS

Niculescu, Dragos, and Nath, Badri, "Ad Hoc Positioning System (APS)," IEEE, 2001, pp. 2926-2931.

(Continued)

*Primary Examiner* — Tuan C. To
(74) *Attorney, Agent, or Firm* — Hitt Gaines, PC

(57) ABSTRACT

A method is provided for estimating distances between sensor nodes. The method includes receiving a temporal sequence of measurements of a selected local environmental condition from each of the sensor nodes. The method includes determining an amount of correlation between the measurements of the selected local environmental condition that were received from two or more of the sensor nodes. The method also includes estimating distances between the two or more of the sensor nodes based on the determined amount of correlation.

9 Claims, 11 Drawing Sheets

(56) References Cited

U.S. PATENT DOCUMENTS

| | | |
|---|---|---|
| 2003/0214397 A1 | 11/2003 | Perkins et al. |
| 2003/0214410 A1 | 11/2003 | Johnson et al. |
| 2003/0236866 A1 | 12/2003 | Light |
| 2004/0198377 A1* | 10/2004 | Becker ................ 455/456.1 |
| 2004/0202139 A1* | 10/2004 | Gutowski et al. ......... 370/335 |
| 2004/0203824 A1* | 10/2004 | Mock et al. ............. 455/452.1 |
| 2005/0135257 A1 | 6/2005 | Stephens et al. |
| 2005/0203970 A1* | 9/2005 | McKeown et al. ......... 707/203 |
| 2005/0271057 A1 | 12/2005 | Kim et al. |
| 2006/0004691 A1* | 1/2006 | Sifry ........................ 707/1 |
| 2006/0114940 A1 | 6/2006 | Cho et al. |
| 2006/0129312 A1 | 6/2006 | Chou et al. |
| 2006/0164997 A1 | 7/2006 | Graepel et al. |
| 2006/0167634 A1 | 7/2006 | Cho et al. |
| 2006/0250980 A1 | 11/2006 | Pereira et al. |
| 2007/0118285 A1 | 5/2007 | Baryshnikov |

OTHER PUBLICATIONS

Patwari, Neal et al., "Locating the Nodes—Cooperative Localizaton in Wireless sensor Networks," IEEE Signal Processing Magazine, Jul. 2005, pp. 54-69.

* cited by examiner

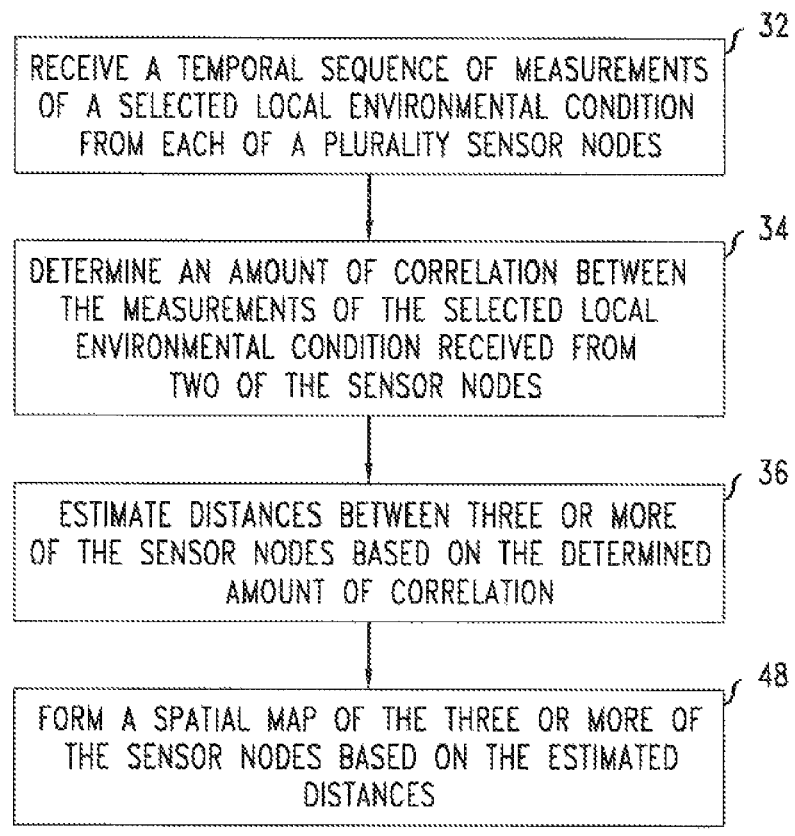

LOCATING SENSOR NODES THROUGH CORRELATIONS

CROSS REFERENCE TO RELATED APPLICATION

This application is a Divisional of U.S. application Ser. No. 11/285,873, filed on Nov. 23, 2005 now U.S. Pat. No. 8,140,261, to Yuliy Baryshnikov entitled "LOCATING-SENSOR NODES THROUGH CORRELATIONS," currently allowed; commonly assigned with the present invention and incorporated herein by reference.

FIELD OF THE INVENTION

The invention relates generally to sensor nodes and methods for operating distributed collections of sensor nodes.

DISCUSSION OF THE RELATED ART

This section introduces various related aspects of the art, which may facilitate a better understanding of aspects of the present invention. While the statements are explanatory, they should not be understood to be admissions of prior art.

It is often desirable to know the spatial locations of the nodes of a network. The spatial locations may, e.g., be determined by directly measuring the distances of the nodes from fixed spatial markers. Such distance measurements may be made physically, e.g., with tape measures, or may be made indirectly with satellite global positioning system (GPS). In either method, the determination of the spatial locations each node of the network may be costly, because the measurements involve either costly human intervention or costly equipment, e.g., multiple GPS transponders.

To reduce expenses, alternate methods have been proposed for determining the spatial locations of the nodes of networks. The alternate methods are almost coordinate-free, because they rely primarily on determining relative locations of node pairs. From the relative locations, absolute spatial locations of the nodes may be determined by combining the measured relative locations with the measurement of the absolute locations of one or a few nodes. For example, determination of absolute locations of the nodes of a network may involve using GPS transponders to determine the absolute spatial locations of one or a few nodes rather than using a GPS transponder to determine the absolute spatial location of each node of the network.

One such alternate method for spatially locating the nodes of a network uses direct communications between node-pairs. According to this method, pairs of nodes communicate directly with each other, i.e., without retransmission via third nodes. Herein, these direct inter-node communications are referred to as "inter-node chatter". During inter-node chatter, one node of a pair transmits, e.g., a signal having a known strength or a known transmission time, and the other node of the pair measures, e.g., the strength of the signal or the arrival time of the signal. From such strength and/or arrival time measurements, the receiving node estimates the attenuation of the signal or the transmission delay of the signal. By comparing the attenuation or transmission delay for inter-node chatter from different transmitting nodes, a receiving node estimates the relative distances of said transmitting nodes, e.g., to determine which transmitting node or nodes are closest.

While this alternate method may enable determinations of relative spatial locations of nodes, methods based on inter-node chatter are often undesirable. Indeed, some types of sensor nodes do not exchange signals with each other and are commonly known as anchorite sensors. In large sensor arrays, e.g., arrays having $10^5$-$10^7$ sensor nodes, anchorite sensors can provide important advantages. In particular, in large sensor arrays, equipping individual nodes to support inter-node chatter would be significantly more costly than making the nodes anchoritic. Thus, the factor of cost may make inter-node chatter an undesirable tool for use in determining the spatial locations of individual nodes.

BRIEF SUMMARY

Certain aspects commensurate in scope with the disclosed embodiments are collection forth below. It should be understood that these aspects are presented merely to provide the reader with a brief summary of some embodiments and that these aspects are not intended to limit the scope of the claims. The invention may however, encompass a variety of aspects that may not be collected below.

In one embodiment, a method is provided for estimating distances between sensor nodes. The method includes receiving a temporal sequence of measurements of a selected local environmental condition from each of the sensor nodes. The method includes determining an amount of correlation between the measurements of the selected local environmental condition that were received from two or more of the sensor nodes. The method also includes estimating distances between the two or more of the sensor nodes based on the determined amount of correlation.

In another embodiment, a data storage medium is provided. The medium encodes a machine-executable or digital processor-executable program. The program includes a sequence of instructions for performing a method. The method includes receiving a plurality of temporal sequences of measurements of a selected local environmental condition. A corresponding sensor node makes each of the sequences of measurements. The method includes determining an amount of correlation between the sequences of measurements of the selected local environmental condition received from two or more of the sensor nodes. The method also includes estimating distances between the two or more of the sensor nodes based on the determined amount of correlation.

BRIEF DESCRIPTION OF THE DRAWINGS

FIG. 8 is a flow chart illustrating a method for mapping the locations of the sensor nodes of a collection, e.g., the sensor nodes of FIG. 1.

Figure 1:
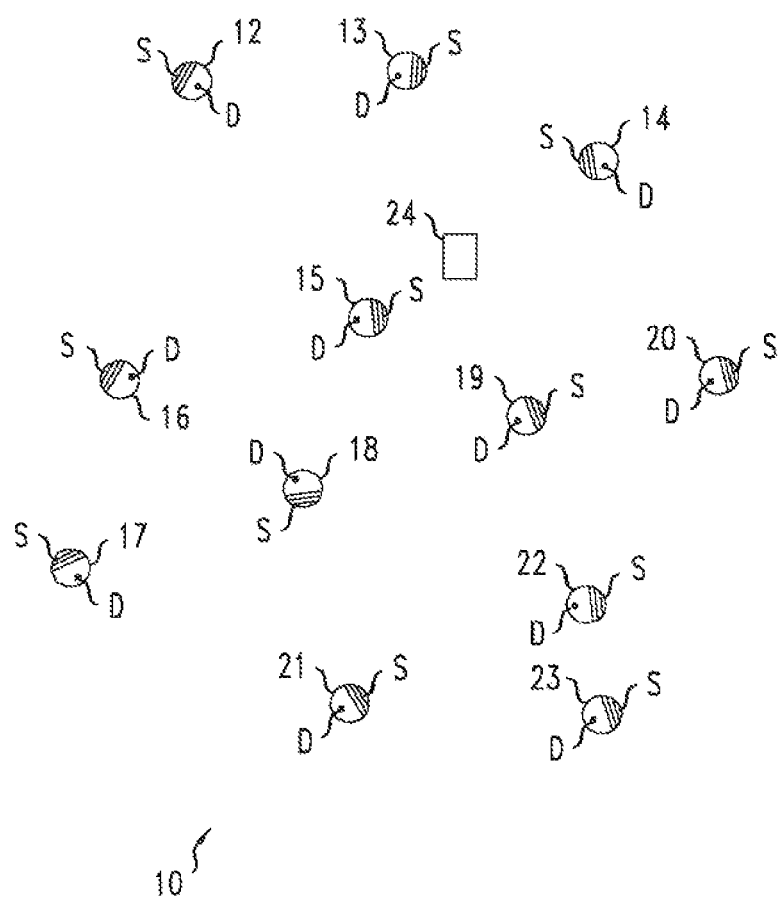
FIG. 1 is a top view that schematically illustrates an exemplary spatially distributed collection of sensor nodes.

Various embodiments are described more fully by the Figures and Detailed Description of Illustrative Embodiments. The inventions may, however, be embodied in various forms and are not limited to embodiments described in the Figures and Detailed Description of Illustrative Embodiments.

In the Figures and Detailed Description of the Illustrative Embodiments, like reference numerals indicate elements with similar functions.

DETAILED DESCRIPTION OF ILLUSTRATIVE EMBODIMENTS

Various embodiments estimate pair wise distances between sensor nodes by determining spatial correlations between local measurements of one or more environmental conditions by different ones of the sensor nodes. Since the local values of the one or more environmental conditions can change in time, spatial correlations between the values measured by a pair of sensor nodes can provide a measure of the spatial separation between the sensor nodes. Using such spatial correlations enables reducing or eliminating reliance on inter-node chatter for determining pair wise distances between nodes.

FIG. 1 shows an exemplary collection 10 of sensor nodes 12-23. The sensor nodes 12-23 are distributed through a spatial region, e.g., a land surface, a bottom of a lake, or the walls of an office building. Various embodiments may have different numbers of such sensor nodes and different spatial distributions of the sensor nodes.

Each sensor node 12-23 includes a sensor, S, that is configured to measure the local value of one or more selected external environmental conditions. The one or more selected external environmental conditions vary in both time and space. Examples of the selected external environmental conditions may include a light intensity, a sound level, a pH level, presence or absence of a cloud shadow, the nearby presence or absence of a vehicle or a random walker such as an animal, etc.

Each sensor node 12-23 is configured to compile an associated list of data entries. In the individual lists, each entry is derived from a local observation of the selected one or more external environmental conditions by the associated node's sensor S. The lists may, e.g., be maintained on data storage devices, D, in the associated sensor nodes 12-23. That is, each node 12-23 may compile and locally store a list of measured values for the one or more selected external environmental conditions. The step of storing may optionally be performed locally on a writeable and readable data storage device, D, in the associated node 12-23.

Figure 2:
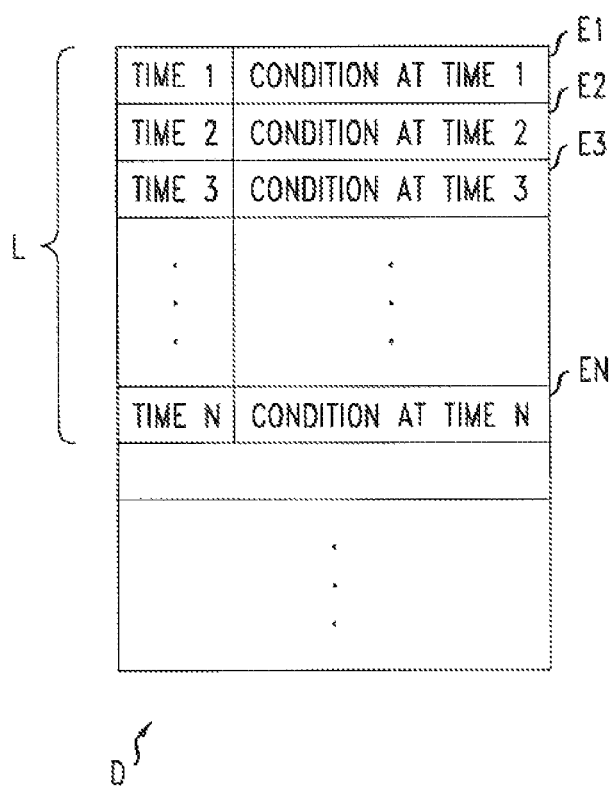
FIG. 2 illustrates a data structure that some embodiments of the individual sensor nodes of FIG. 1 maintain.

FIG. 2 illustrates one example of such a list, L. The list L is, e.g., stored on the data storage device D of the associated sensor node 12-23. The sensor node 12-23 produces the list L in response to a sequence of N measurement cycles with its sensor S. The associated sensor node 12-23 may update the list L periodically to add a new entry. The list L includes one entry E1, E2, E3, . . . , EN for each of the N measurement times. Each entry E1, . . . , EN provides a measurement time and the measured local value(s) of the one or more selected environmental conditions at the measurement time of the entry E1, . . . , EN. Each measured value may be a direct measurement of the node's sensor S, e.g., a sky light intensity, or may be derived from a direct measurement of the node's sensor S. An example of a value derived from a direct measurement is a binary value for the presence or absence of a cloud shadow at the associated sensor node. Such a value could, e.g., be derived from a light intensity measurement by the node's sensor S. In some embodiments, the measurement times are omitted from the entries E1, . . . , EN, because the times are inherent from the sequential positions of the entries E1, . . . , EN on the list L.

In some embodiments, the collection 10 also includes a central receiver 24 that is configured to receive communications from the nodes 12-23. The central receiver 24 receives from each node 12-23 a list of the local measurements of the one or more selected environmental conditions, e.g., list L of FIG. 2. The central receiver 24 may, e.g., be an access point for a contention neighborhood of a network.

In other embodiments, the collection 10 is a spatially distributed set of sensor nodes 12-23, wherein the sensor nodes 12-23 are not configured to communication with such a centralized receiver 24. Instead, the individual sensor nodes 12-23 are distributed over a spatial region, e.g., to sense and record local conditions at various positions in the region over a fixed time period. The individual sensor nodes 12-23 may, e.g., record one or more local environmental conditions such as local temperature, local light intensity, local sound intensity, or local pH and/or salinity at the bottom of a lake. At the end of the fixed time period, the individual sensor nodes 12-23 may be collected for readout of the measurements made. For example, sensor nodes 12-23 that record environmental conditions at the bottom of a lake may be configured to float to the lake's surface for collection and downloading of recorded measurements of the environmental condition(s) at the bottom of the lake.

In some embodiments, the collection 10 of sensor nodes 12-23 is spatially distributed over a land region such that each sensor, S, is facing skyward. In such an embodiment, each sensor node 12-23 may be configured to distinguish whether it is in a shadow of a cloud or is not in a shadow of a cloud. For example, each sensor node 12-23 may be able to distinguish temporally abrupt decreases and increases in the sky light intensity seen by its sensor S. Such temporally abrupt increases and decreases would, e.g., result from an edge of cloud passing between the sensor S and the sun.

In various embodiments, it is desirable to obtain information on pair wise distances between the sensor nodes 12-23 from the local measurements by the sensors In some embodiments, the sensor nodes 12-23 are anchorite nodes, i.e., nodes that do not perform inter-node chatter.

Figure 3:
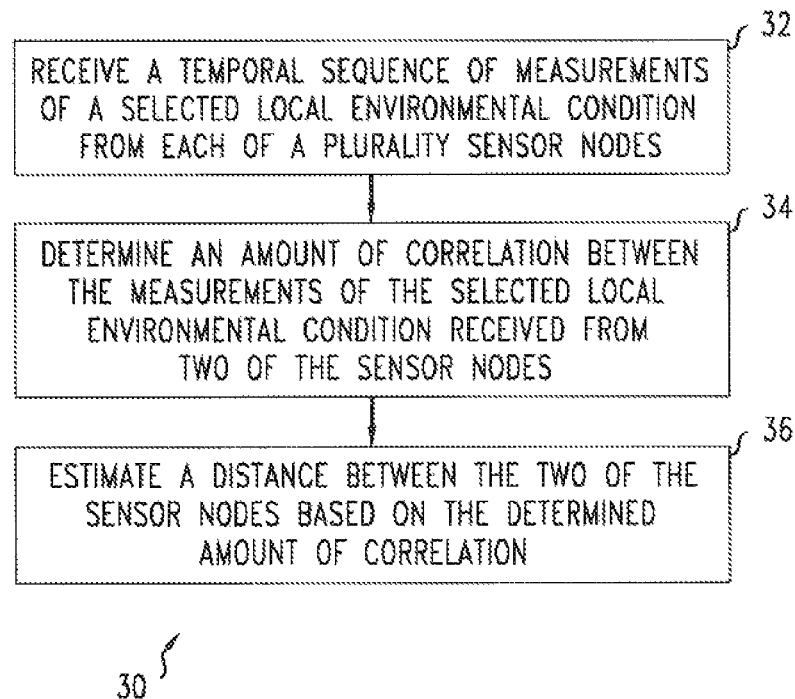
FIG. 3 is a flow chart illustrating a method for estimating pair wise distances between sensor nodes, e.g., the sensor nodes of the collection in FIG. 1.

FIG. 3 illustrates a method 30 of estimating pair wise distances between sensor nodes of a spatially distributed collection, e.g., collection 10 of FIG. 1.

The method 30 includes receiving a sequence of measurements of one or more selected environmental conditions from each of the sensor nodes (step 32). In each sequence, the individual measurements are values of one or more selected local environmental condition(s) as measured at one of the sensor nodes at a sequence of times. For example, each sequence may be a list of entries E1, . . . , EN similar to list L of FIG. 2. In each sequence, each individual measurement is a value of the one or more selected environmental conditions observed at the location of the corresponding sensor node, e.g., sensor nodes 12-23 of FIG. 1.

In the various embodiments of the method 30, each of the one or more selected environmental conditions varies in both space and time. Exemplary selected environment conditions have been described with respect to the collection 10 of sensor nodes 12-23 of FIG. 1. The selected external environmental conditions may include a light intensity, a sound level, a pH level, a salinity level, presence or absence of a cloud shadow, nearby presence or absence of a vehicle or a random walker such as an animal, etc. The values of measurements received at the step 32 may be values of direct measurements by the nodes' sensors, e.g., measured intensities of sun light, or may be values derived from direct measurements by the nodes' sensors, e.g., the presence of absence of a cloud shadow. The lists of measurements of the selected environmental condition(s) may be measured by the different sensor nodes at the same sequence of time values or at different sequences of time values.

The method 30 includes determining a spatial correlation between the measurements received from two or more of the sensor nodes (step 34). The determination of the spatial correlation may, e.g., involve averaging over all or part the temporal sequence of received measurements of one of more of the selected environmental conditions. Each local value of a selected environmental condition is described by a variable whose value depends on both time, $t_k$, and location, j, i.e., $\xi = \xi_j(t_k)$. For such a variable $\xi$, the N-point spatial correlation, $\langle \xi_{j1} ggg \xi_{jN} \rangle_N$, may be, e.g., evaluated as a time average given by:

$$\langle \xi_{j1} ggg \xi_{jN} \rangle_N = K^{-1} \sum_{p=1}^{K} \xi_{j1}(t_p) ggg \xi_{jN}(t_p).$$

In the above-definition, the sum is over a set of times "p" at which the variable $\xi_j(t_k)$ has been measured. Indeed, the sum may be over part or all of the sequence of times in the lists of measurements received in the step 32. The above form of the N-point spatial correlation often converges to a value that is fairly insensitive to the set of times used in the temporal average. For example, convergence may be expected if the average is over a large number, K, of times, and the individual times $t_p$ of the average are uniformly spread over a long enough time period.

Furthermore, the value of the N-point spatial correlation depends on the N spatial locations, i.e., j1, ... jN, of the local variable, $\xi$, therein. For that reason, the N-point correlation provides information on relative distances between the spatial points, i.e., j1, ... jN, where the local variable, $\xi$, is measured by the N sensor nodes.

The method 30 includes estimating distances between the two or more of the sensor nodes based on the determined spatial correlation(s) between measurements of the one or more selected environmental conditions by the two or more sensor nodes (step 36). The step of estimating distances may, e.g., involve explicitly determining pair wise distances between sensor nodes or may involve qualitatively determining pair wise distances between said sensor nodes. As an example of qualitatively determining said pair wise distances, the estimating step may involve producing lists of near neighbor sensor node pairs and/or lists of widely separated sensor node pairs.

In some embodiments of method 30, step 36 of estimating distances between two or more of the sensor nodes may be performed without using any GPS location-determinations. That is, some embodiments of step 36 do not use any GPS-derived location information on the sensor nodes whose relative distances are determined.

Different embodiments of method 30 may use spatial correlations with different numbers of points in steps 34 and 36. For example, some embodiments may use only 2-point spatial correlations at steps 34 and 36. As a further example, other embodiments may use only 3-point correlations at steps 34 and 36. As a yet further example, other embodiments may use 2-point and 3-point correlations at steps 34 and 36. Finally, yet other embodiments, may use spatial correlations with more than three points.

In various embodiments, it may be advantageous to base the method 30 on a special type of spatial correlation, i.e., the 2-point cumulant. The 2-point cumulant of a local variable, $\xi$, which corresponds to a selected local environmental condition, will be written as $\langle \xi_{j1} \xi_{jN} \rangle_{2-CM}$ and is given by:

$$\langle \xi_{j1} \xi_{j2} \rangle_{2-CM} = \langle \xi_{j1} \xi_{j2} \rangle_2 - \langle \xi_{j1} \rangle_1 \cdot \langle \xi_{j2} \rangle_1.$$

N-point cumulants can have simple spatial properties due to a clustering property that is often obeyed by spatial correlations of local variables. According to clustering, an N-point spatial correlation should factorize into a product of a single point spatial correlation and an (N-1)-point spatial correlation as the distance between the first point and the other (N-1) points of the N-point spatial correlation become large. In particular, the cluster property is:

$$\langle \xi_{j1} ggg \xi_{jN} \rangle_N \xrightarrow[|j1-jQ| \to \infty \ for\ Q=2,\ldots,N]{} \langle \xi_{j1} \rangle_1 \langle ggg \xi_{jN} \rangle_{N-1}.$$

In light of this property, associated N-point cumulants typically have values that decrease as pair wise distances between the points therein increase, i.e., at least for large enough distances.

The 2-point cumulant, $\langle \xi_{j1} \xi_{jN} \rangle_{2-CM}$, of a local variable, $\xi_j(t_k)$, often has further properties that make it simple to use in making estimations of the pair wise distances between its two spatial points. The 2-point cumulant is typically positive when its spatial points coincide, i.e., j1=j2, and thus, is typically also positive over a small range of separations of its two points. Furthermore, the cluster property implies that the 2-point cumulant should go to zero as its two points become separated by large distances. Thus, the magnitude of the 2-point cumulant of a local variable, will often provide a rather direct measure of the relative distance between its points, at least, for small enough separations of said points.

FIGS. 4A-4E illustrate the operation of embodiments of method 30 in which cloud shadows are used to determine pair wise distances between the sensor nodes 12-23 of FIG. 1. That is, the selected environmental variable is the presence or absence of a cloud shadow at a node's sensor S, i.e., a local binary variable.

Figure 4A:
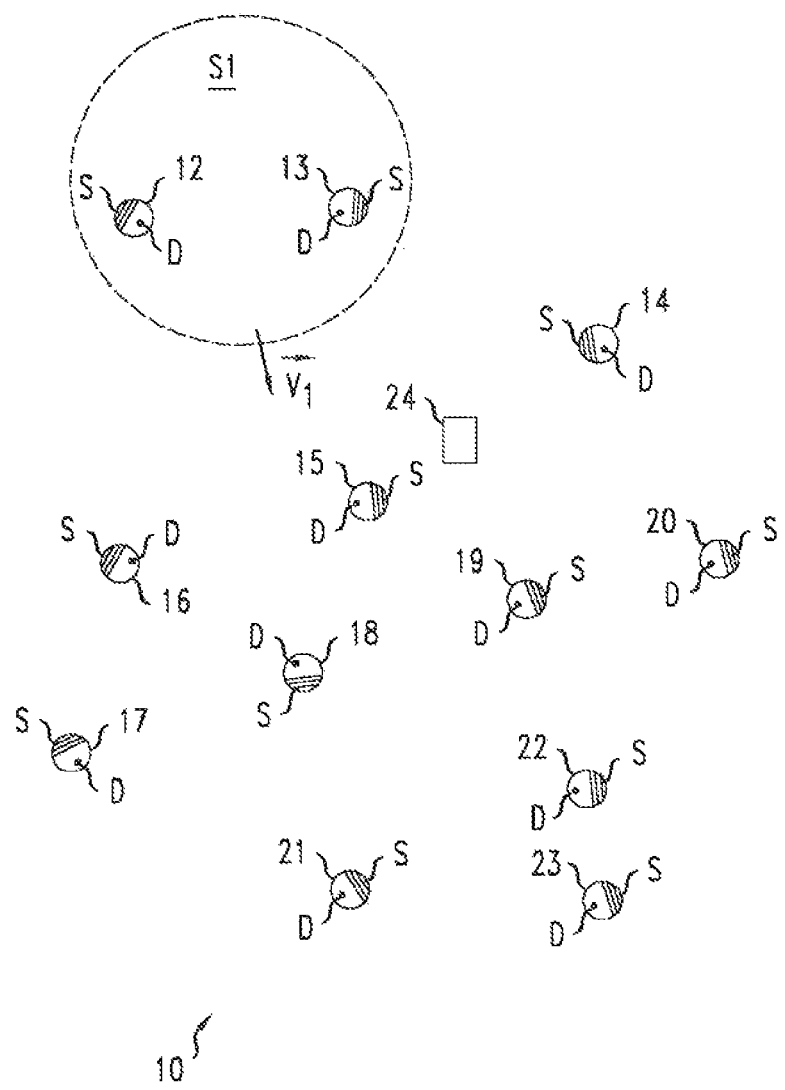
FIG. 4A-4C illustrate how a cloud shadow may move over a collection of sensor nodes in an embodiment of the method of FIG. 3 where each sensor node measures a local binary variable for the presence or absence of a cloud shadow.
Figure 4B:
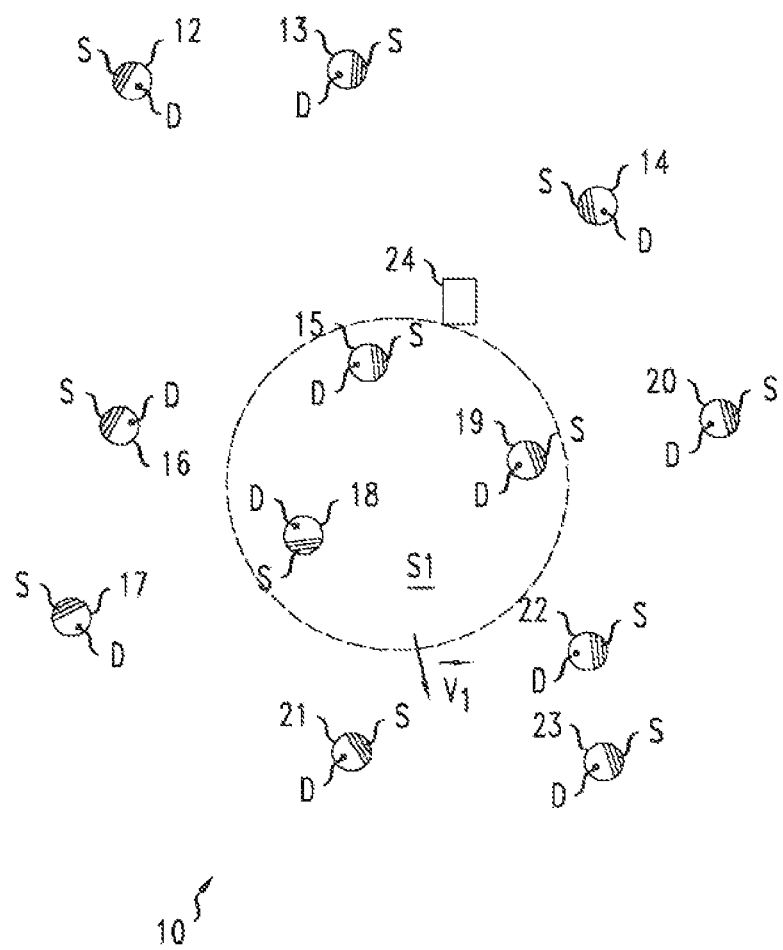
Figure 4C:
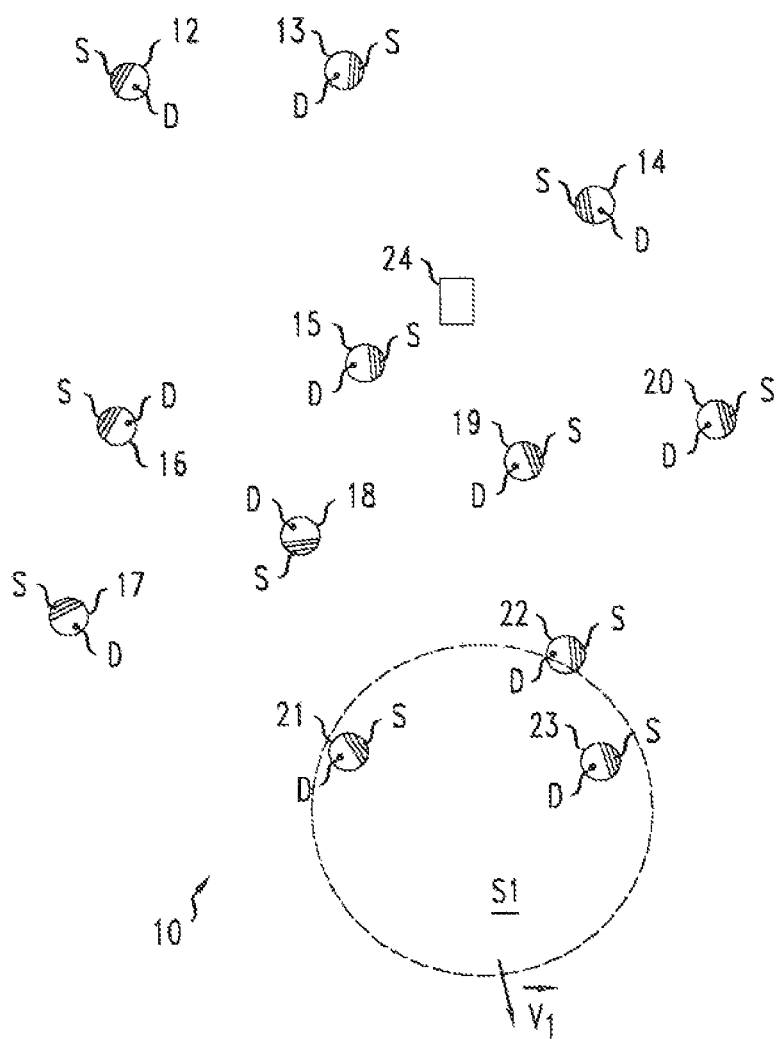

FIGS. 4A-4C provide a time-lapse sequence of pictures of the motion of the shadow, S1, of an exemplary circular cloud that moves with velocity, $\vec{u}$, over a region on which sensor nodes are distributed, i.e., the sensor nodes 12-23 of FIG. 1. At the time of FIG. 4A, the sensor nodes 12 and 13 are both in the shadow S1 and thus, will record the same value of the binary variable associated with the presence or absence of a cloud shadow. Similarly, at the time of FIG. 4B, the sensor nodes 12 and 13 are both outside of the shadow S1 and thus, will again record the same value of the binary variable associated with the presence or absence of a cloud shadow. At the time of FIG. 4B, the sensor nodes 15, 18, and 19 are in the shadow S1 and thus, will record the same value of the binary variable associated with the presence or absence of a cloud shadow. At the time of FIG. 4C, the sensor nodes 15, 18, and 19 are not the shadow S1 and thus, will again record the same value of the binary variable associated with the presence or absence of a cloud shadow. At the time of FIG. 4C, the sensor nodes 21 and 23 are in the shadow S1 and thus, will record the same value of the binary variable associated with the presence or absence of a cloud shadow. Thus, FIGS. 4A-4C illustrate that the passage of the cloud shadow S1 can produce a nontrivial spatial correlation between the measurements of sensor nodes 12 and 13; a nontrivial spatial correlation between the measurements of sensor nodes 15, 18, and 19; and a nontrivial spatial correlation between the measurements of sensor nodes 21 and 23. Indeed, such spatial correlations are indicative of the small pair wise distances between the sensor nodes in each of these three subsets.

Figure 5:
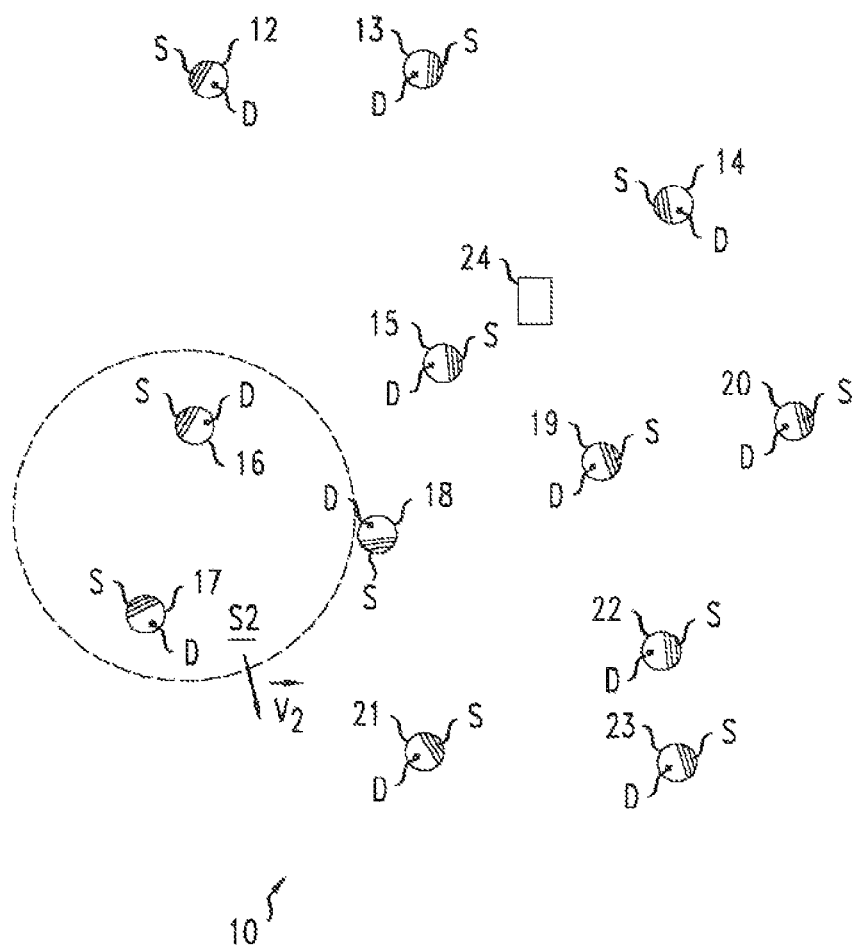
FIG. 5 illustrates how a cloud shadow may move along a different path over the collection of sensor nodes in the same embodiment illustrated in FIGS. 4A-4C.

FIG. 5 shows a circular shadow, S2, of a second cloud that has velocity, $\vec{u}$, over the region on which the sensor nodes 12-23 are distributed. The shadow S2 of the second cloud travels over a portion of the sensor nodes 12-23 along a different path and thus, can generate correlations between the measurements of the presence or absence of a cloud shadow between different spatially close pairs of sensor nodes 12-23. In particular, the shadow S2 may generate nontrivial spatial correlations between the measurements of the presence or absence of a cloud by sensor nodes 16 and 17, which did not detect the shadow S1 of the first cloud.

Figure 6:
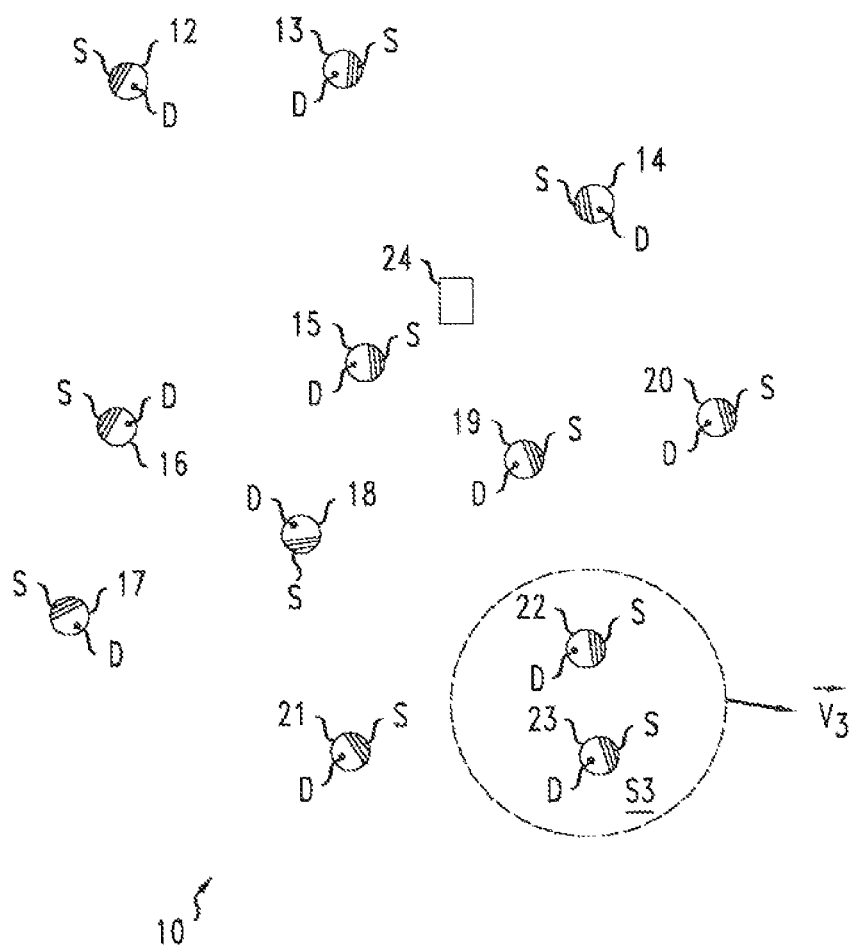
FIG. 6 illustrates how a cloud shadow of a different size may move along a another path over the collection of sensor nodes in the same embodiment illustrated in FIGS. 4A-4C.

FIG. 6 shows a circular shadow, S3, of a third cloud that has a velocity, $\vec{u}$, over the region on which the sensor nodes 12-23 are distributed. The shadow S3 of the third cloud can generate nontrivial spatial correlations between the measurements of presence or absence of a cloud shadow by sensor nodes 22 and 23. Indeed, the shadow S3 is smaller than shadows S1 and S2 so that nontrivial correlations produced by the passage of this cloud can distinguish that the sensor nodes 22 and 23 have a smaller pair wise separations that other pairs of sensor nodes, e.g., the pair of sensor nodes (16, 17).

FIGS. 4A-4C, 5, and 6 illustrate how cloud shadows of different sizes and along different paths can generate spatial correlations among between measurements of the sensor nodes 12-23. These examples illustrate that the measured 2-point cumulant of a variable for the presence or absence of cloud shadows provides a useful measure of pair wise distances between sensor nodes in the method 30 of FIG. 3.

Figure 7A:
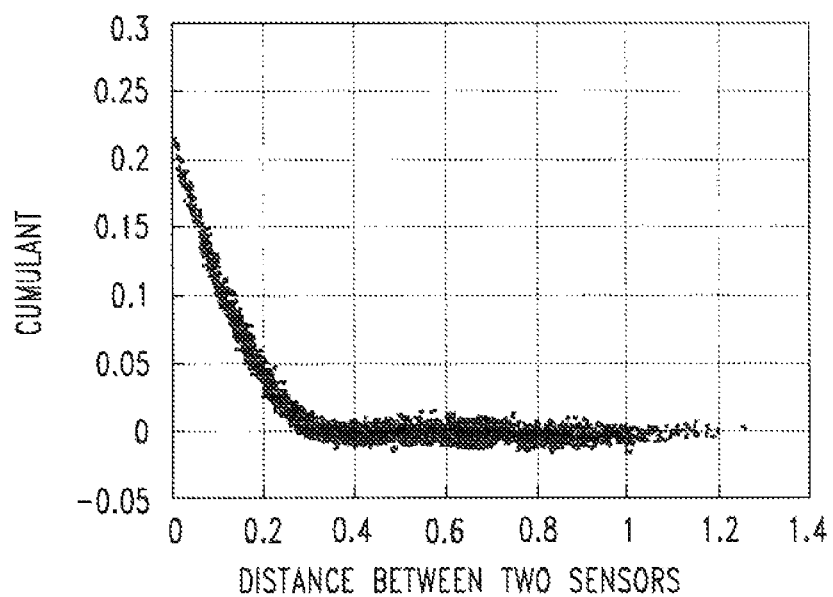
FIG. 7A plots magnitudes of 2-point cumulants that were simulated for round clouds in an embodiment of the method of FIG. 3 where the sensor nodes measure a local variable for the presence or absence of a cloud shadow.
Figure 7B:
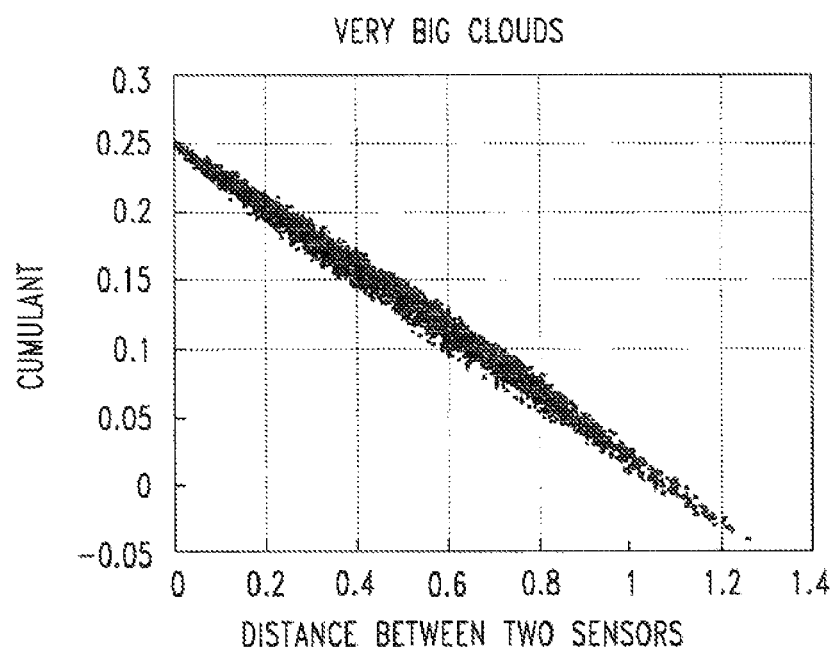
FIG. 7B plots magnitudes of 2-point cumulants that were simulated for ½-plane clouds in an embodiment of the method of FIG. 3 where the sensor nodes measure a variable for the presence or absence of a cloud shadow.

FIGS. 7A and 7B show the results of two simulations of 2-point cumulants as a function of pair wise distance between the sensor nodes of a larger collection. The 2-point cumulants are spatial correlations for a local binary variable whose value again determines whether a cloud shadow is present or absent. In the simulations, about 1,000 sensor nodes were distributed with a substantially random uniform spatial distribution over the unit square, and about 1,000 time measurements of the local variable for the presence or absence of a cloud shadow were made to evaluate the 2-point cumulants.

FIG. 7A plots results of a simulation in which cloud shadows were round and had radii uniformly distributed in the interval [0, 0.4] as a Poisson random field with density 40. The plots show the measured magnitude of the 2-point cumulant of the binary variable for presence or absence of a cloud shadow as a function of pair wise distances between the sensor nodes actually measuring this binary variable. For pair wise distances of about 0.2 or less, the simulated magnitudes of the 2-point cumulant correlate well with the distances between the measuring sensor nodes. When using the 2-point cumulant to determine these distances, the simulation indicates an error that is roughly equal to the vertical spread in the simulation points.

FIG. 7B shows the results of a simulation in which the cloud shadows were ½-planes bounded by lines whose orientations had an isotropic distribution. Again, the simulation results plot the magnitude of the 2-point cumulant of the binary variable for presence or absence of a cloud shadow as a function of the pair wise distance between the sensor nodes actually measuring the binary variable. For a large range of pair wise distances, the simulated magnitudes of the 2-point cumulant correlate well with the pair wise distances between the measuring sensor nodes.

While the magnitude of 2-point cumulant for the variable indicating presence or absence of a cloud shadow correlates well with distance in each of the simulations of FIGS. 7A and 7B. FIGS. 7A and 7B also show that the 2-point cumulant's dependence on distance may be sensitive to the distribution of cloud shadows used in evaluating the temporal average. This "ensemble" dependence may be lower if the 2-point cumulant is used to only identify close neighboring sensor nodes. Thus, in some embodiments of method 30, estimating step 36 may only use an above threshold magnitude of this 2-point cumulant as the indication that a very small distance separates a corresponding pair of the sensor nodes. For example, in the simulations of FIGS. 7A-7B, the estimating step 36 of method 30 shown in FIG. 3 could have used a threshold magnitude of about 0.22 to 0.23 for the 2-point cumulant as indicating that the distance between the corresponding pair of sensor nodes is less than about 0.1. In such an embodiment, the distance-estimating step 36 would simply determine which pairs of sensor nodes correspond to near neighbors.

FIG. 8 illustrates a method 40 of spatially mapping sensor nodes in a spatially distributed collection, e.g., sensor nodes 12-23 of FIG. 1.

The method 40 includes performing steps 32, 34, and 36 as described for one of the embodiments of method 30 of FIG. 3. In this embodiment, the steps 34 and 36 include however, determining spatial correlations and estimating pair wise distances between at least three of the sensor nodes. In particular, the method 40 includes forming a spatial map of the at least three sensor nodes based on the estimated distances between pairs of the sensor nodes as found at step 36 (step 48).

In some embodiments of the method 40, step 48 produces a spatial map in the form of a connectivity pattern for the sensor nodes. Such a patterns show, e.g., how many hops between near neighbor sensor nodes are needed to go between a pair of sensor nodes. That is, such a map could simply indicate which pairs of nodes are physically close to each other.

In other embodiments of the method 40, step 48 produces a spatial map of the physical locations of the sensor nodes, i.e., based on estimates of actual physical distances as derived from the pair wise separations of the sensor nodes. Indeed, algorithms and methods that use triangulation and/or angular separation algorithms for making such maps are known for constructing such physical spatial maps from estimates of the physical pair wise separations of the points being mapped. Examples of such algorithms are described in one or more of "Locating the Nodes" by Neal Patwari et al, IEEE Signal Processing Magazine (July 2005) pages 54-69; "Ad hoc positioning system (APS)" by Dragos Niculescu et al, GLOBECOM 2001-IEEE Global Telecommunications Conference, no. 1, November 2001 pages 2926-2931; published U.S. Patent Application No. 20030128355 A1 of Neal Patwari et al; and published U.S. Patent Application No. 20030130793 A1 of Neal Patwari et al. The two above-listed articles and two above-listed published U.S. patent applications are incorporated herein by reference in their entirety. The step 48 of method 40 may use one of the above-described methods.

In some embodiments of method 40, step 48 produces a spatial map of the sensor nodes of a collection based, in part, on one or a few absolute location-determinations. Indeed, in some embodiments, one or a few of the sensor nodes have a GPS transponder that is used to absolutely locate the corresponding sensor node. Then, the step 48 uses the absolute locations of the one or a few sensor nodes and the pair wise distances of sensor nodes as obtained at step 36 to estimate the absolute locations of the entire collection of sensor nodes.

Figure 9:
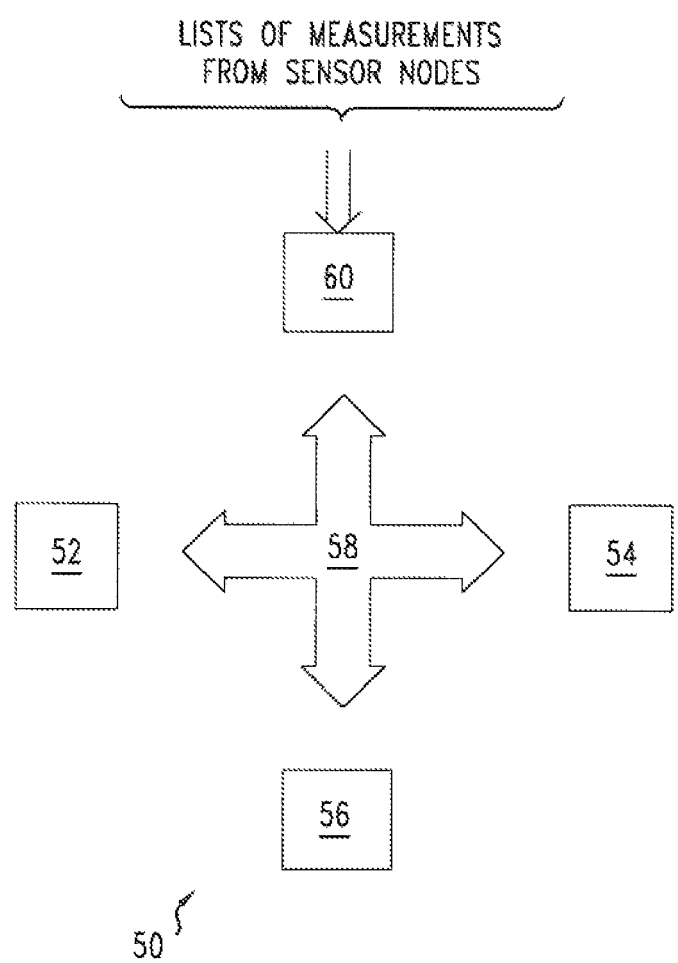
FIG. 9 schematically illustrates a hardware device for performing the method of FIG. 3 and/or the method of FIG. 8.

FIG. 9 illustrates an exemplary hardware device 50 for implementing various embodiments of above-described methods 30 and 40 of FIGS. 3 and 8. For example, the hardware device 50 may be located in central receiver 24 of FIG. 1.

The hardware device 50 includes a conventional digital processor 52; a random access memory 54; a program storage medium 56, e.g., a magnetic or optical disk, read-only memory, or a hard drive; and one or more internal digital data buses 58. The hardware device 50 also includes one or more communication interfaces 60 for receiving the lists of temporal sequences of locally measured values for one or more selected environmental conditions, e.g., lists L of FIG. 2, from the measuring sensor nodes, e.g., sensor nodes 12-23 of FIG. 1. The communication interface 60 may, e.g., be a wireless communication interface configured to receive transmissions of said lists from the individual sensor nodes or from a subset of said sensor nodes. Alternatively, the communication interface 60 may, e.g., be a keyboard or other interface for receiving said lists of measurements from the sensor nodes. In this later embodiment, the lists may be collected from the sensor nodes by an operator who then, uses the interface 60 to manually transmit the lists to the hardware device 50 for further processing according to above-described method 30 or 40. The program storage medium 56 and/or the random access memory 54 store a program of instructions for performing the method 30 or 40. The instructions of the program are stored in a form executable on the digital processor 52.

From the above disclosure, the figures, and the claims, other embodiments will be apparent to those of skill in the art.

What I claim is:

1. A data storage medium encoding a machine-executable or digital processor-executable program, the program including a sequence of instructions for performing a method, the method comprising:
   receiving a plurality of temporal sequences of measurements of a selected local environmental condition, each sequence of measurements being made by a corresponding sensor node;
   determining an amount of correlation between the sequences of measurements of the selected local environmental condition received from two or more of the sensor nodes; and
   estimating a distance between the two or more of the sensor nodes based on the determined amount of correlation.

2. The medium of claim 1, wherein the correlation is a spatial correlation between the measurements from the two or more of the nodes.

3. The medium of claim 1, wherein each of the received measurements has a time stamp representing the time of the corresponding one of the measurements.

4. The medium of claim 1, wherein the step of determining is made without processing a communication between the two or more of the sensor nodes.

5. The medium of claim 1, wherein the receiving includes processing communications received from mobile devices, each communication having one of the sequences, one of the mobile devices corresponding to each of the sequences.

6. The medium of claim 1, wherein the receiving includes processing communications received from spatially fixed nodes, each communication having one of the sequences, one of the spatially fixed nodes corresponding to each of the sequences.

7. The medium of claim 1, wherein the steps of determining and estimating are performed without using GPS location-determinations of any of the two or more of the sensor nodes.

8. The medium of claim 1, the method further comprising:
   making a map to represent spatial locations of more than two of the sensor nodes based on the estimated one or more distances between at least three of the sensor nodes.

9. The medium of claim 1, wherein the step of determining includes determining a 2-point cumulant between two of the sensor nodes.

* * * * *